United States Patent [19]
Cody et al.

[11] Patent Number: 5,158,670
[45] Date of Patent: Oct. 27, 1992

[54] HYDROCARBON CATALYTIC CRACKING UTILIZING A PRECOKED CATALYST

[75] Inventors: Ian A. Cody, Sarnia, Ontario, Canada; Gordon F. Stuntz, Baton Rouge, La.; William G. McKnight, Houston, Tex.

[73] Assignee: Exxon Research and Engineering Company, Florham Park, N.J.

[21] Appl. No.: 683,764

[22] Filed: Apr. 10, 1991

Related U.S. Application Data

[63] Continuation-in-part of Ser. No. 471,999, Dec. 27, 1989, abandoned.

[51] Int. Cl.⁵ ............ C10G 11/02; B01J 20/34; B01J 29/04
[52] U.S. Cl. .................... 208/120; 208/113; 502/31; 502/85
[58] Field of Search ............ 208/120, 113; 502/31, 502/85

[56] References Cited

U.S. PATENT DOCUMENTS

| | | | |
|---|---|---|---|
| 3,394,075 | 7/1968 | Smith | 208/120 |
| 4,358,395 | 11/1982 | Haag et al. | 502/53 |
| 4,554,260 | 11/1985 | Pieters et al. | 585/407 |

*Primary Examiner*—Asok Pal
*Assistant Examiner*—Nhat Phan
*Attorney, Agent, or Firm*—Penny L. Prater

[57] ABSTRACT

A catalytic cracking process is provided in which a zeolitic cracking catalyst having the structure of faujasite is first regenerated, then coked at a high catalyst to hydrocarbon weight ratio, and, subsequently utilized to crack a hydrocarbon feed boiling from about 430°F. to 1050° F. at a lower catalyst to hydrocarbon feed ratio.

13 Claims, 1 Drawing Sheet

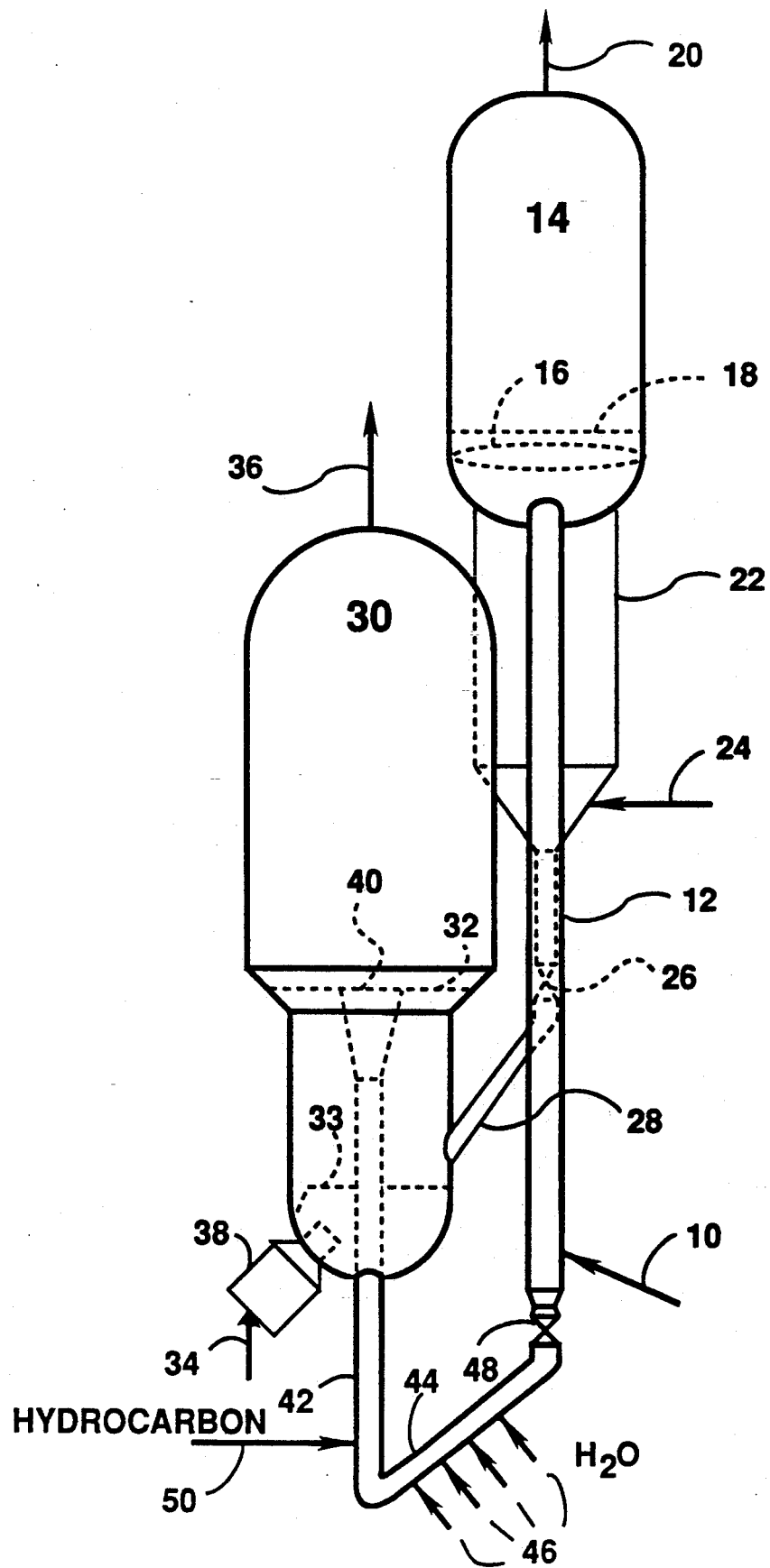

HYDROCARBON CATALYTIC CRACKING UTILIZING A PRECOKED CATALYST

CROSS REFERENCE TO RELATED APPLICATIONS

This is a continuation-in-part application of U.S. Ser. No. 471,999 filed Dec. 27, 1989, now abandoned.

FIELD OF THE INVENTION

This invention relates to an improvement in the hydrocarbon catalytic cracking process utilizing a precoked catalyst.

DESCRIPTION OF INFORMATION DISCLOSURES

It is known to crack hydrocarbonaceous feeds utilizing regenerated zeolitic cracking catalysts that have various amounts of residual carbon deposits.

It is known that zeolitic cracking catalysts are susceptible to decreased activity and decreased selectivity as coke on regenerated catalyst increases. For example, Wachtel et al., Prepr. Div. Pet. Chem. Am. Chem. Soc. 16 (3), ASS (1971), demonstrated that in-creased carbon levels on the cracking catalyst, arising from incomplete regeneration subsequently caused a decrease of valuable naphtha and an increase in un-desired carbon and light gas ($C_3-$).

The detrimental effect of carbon on re-generated catalyst on activity and selectivity of cracking catalyst is discussed by Venuto and Habib in "Fluid Catalytic Cracking" p. 69, Marcel Dekker, Inc., N.Y., N.Y. 1979.

U.S. Pat. No. 3,394,075 discloses a regeneration process in which a uniform deposit of coke is left on the regenerated zeolitic cracking catalyst to obtain better temperature control. See column 1, lines 56 to column 2, line 17. It does not show improved selectivity by residual carbon on regenerated catalyst.

U.S. Pat. No. 4,364,848 discloses passivating a regenerated fluid cracking catalyst by contacting the regenerated catalyst with a hydrocarbon gas with molecules of 3 carbon atoms or less. See also U.S. Pat. No. 4,404,090 in which the regenerated catalyst is contacted with a water saturated hydrocarbon gas having up to 3 carbon atoms.

U.S. Pat. No. 3,923,642 discloses introducing hydrocarbons into a riser containing hot regenerated catalyst. The partially cracked oil plus catalyst particles may be passed to a dense phase fluid bed reaction zone to crack the oil additionally.

It is known to contact certain regenerated cracking catalysts with steam prior to the catalyst contacting the hydrocarbonaceous oil to be cracked. See, for example, U.S. Pat. Nos. 3,838,036; 3,844,973; and 4,348,272.

It has now been found that treatment of a zeolitic cracking catalyst with a hydrocarbon material at a high catalyst to hydrocarbon weight ratio to deposit a specified amount of carbon on the catalyst will produce a precoked catalyst having improved selectivity and other advantages that will become apparent in the ensuing description.

SUMMARY OF THE INVENTION

In accordance with the invention there is provided, a catalytic cracking process which comprises contacting, at catalytic cracking conditions, a hydrocarbonaceous feed boiling from about 430° F. to about 1050° F. with a crystalline zeolite-containing cracking catalyst, said catalyst having a faujasite structure and having been produced by contacting a regenerated catalyst having the structure of faujasite with a hydrocarbon material at a high catalyst to said hydrocarbon weight ratio ranging from about 50:1 to 10,000:1 for a time and at conditions sufficient to deposit from about 0.01 to about 0.5 wt. % carbonaceous material on said regenerated catalyst prior to contacting said feed at said cracking conditions.

By the term "regenerated catalyst" is intended herein a catalyst that has been subjected to oxidation to remove at least a portion of the carbonaceous deposit that was on the catalyst due to prior usage.

BRIEF DESCRIPTION OF THE DRAWINGS

The FIGURE is a schematic flow plan of one embodiment of the invention.

DETAILED DESCRIPTION OF THE INVENTION

The catalyst to be used in the catalytic cracking process of the invention is obtained by contacting a regenerated zeolitic cracking catalyst with a hydrocarbon material (precoking medium) at a high catalyst to hydrocarbon weight ratio ranging from about 50:1 to 10,000:1, preferably from about 200:1 to 1000:1, at conditions and for a time sufficient to deposit from about 0.01 to 0.5 wt. %, preferably from about 0.05 to about 0.20 wt. % carbonaceous material on the regenerated catalyst, based on the weight of the total regenerated catalyst. The regenerated catalyst prior to being contacted with the precoking medium at the high catalyst to hydrocarbon ratio may have from about 0.001 to about 0.50 wt. % coke deposit (residual coke) that has not been removed during the regeneration.

The contact of the regenerated catalyst at the high catalyst to hydrocarbon ratio may suitably be conducted at a temperature ranging from about 900° to about 1450° F., preferably from about 1200° to about 1350° F. and at a pressure ranging from about 0 to about 150 psig, preferably at a pressure ranging from about 10 to about 50 psig, for a time sufficient to deposit the desired amount of carbon (coke) on the regenerated catalyst by cracking of the hydrocarbon material utilized.

Suitable hydrocarbon material for contact at said high catalyst to oil weight ratio may be single types of hydrocarbons which may be alkanes, alkenes, aromatics, mixtures of hydrocarbons such as light hydrocarbon oil, heavy hydrocarbon oil and mixtures thereof. Preferably the hydrocarbon material is a heavy hydrocarbonaceous oil. By way of examples, suitable hydrocarbon materials include naphtha, gas oils, residua, that is vacuum residua, atmospheric residua, process streams, light cycle oil, heavy cycle oil, deasphalted oil, coker gas oils, lube extracts, and mixtures thereof. The hydrocarbon material may be derived from any source, such as petroleum, shale oil, tar sand oil, liquids derived from coal liquefaction processes and mixtures thereof. Preferably the hydrocarbon material used as precoking medium is a portion of the process hydrocarbonaceous feed.

The regenerated catalyst on which coke has been deposited after regeneration will hereinafter also be designated the "precoked catalyst". The precoked catalyst may be used as such without any intervening treatment. For one embodiment of the invention, the precoked catalyst is contacted with $H_2O$ (steam or water) at conditions to produce a hydrated precoked catalyst. Suitable amounts of $H_2O$ injected into the catalyst stream to contact the catalyst may range about 0.005 to 1.0 weight percent water, preferably from about 0.05 to 0.10 weight percent water based on the weight of the total catalyst. The $H_2O$ contacting step (i.e., hydration) can be performed after coking the regenerated catalyst or the precoking and hydration can be performed simultaneously by contacting the regenerated catalyst with a mixture of the hydrocarbon material used for the precoking step and $H_2O$. When the hydration is conducted simultaneously with the precoking step, the conditions will be the same as used in the precoking step. When the hydration step follows the precoking step, suitable hydration conditions include a temperature ranging from about 800° to 1200° F., preferably from about 900° to 1100° F., and a pressure ranging from about 0 to 50 psig, preferably from about 0 to 30 psig using $H_2O$, or a gas comprising from about 10 mole % to 100% steam, for a time sufficient to obtain the desired level of hydration.

Suitable cracking catalysts for use in the process of the present invention include cracking catalysts comprising a crystalline zeolite and a non-zeolitic inorganic oxide matrix. Suitable zeolites for use as component of the cracking catalyst are any of the naturally occurring or synthetic crystalline zeolites. Examples of these zeolites include zeolites designated by the Linde Division of Union Carbide by the letters of X, Y, A, L (these zeolites are described in U.S. Pat. Nos. 2,882,244; 3,130,007; 3,882,243; and 3,216,789, respectively); naturally occurring crystalline zeolite such as faujasite, chabazite, erionite, mordenite, offretite, gmelinite, analcite, etc., ZSM-type zeolites, such as ZSM-5 described in U.S. Pat. No. 3,702,886. Preferably, the zeolite is a crystalline aluminosilicate zeolite. More preferably, the zeolite is a zeolite having the structure of faujasite, especially Y-type zeolite. By "Y-type" zeolite is intended herein a zeolite having a silica to alumina mole ratio of at least about 3, the structure of faujasite and uniform pore diameters ranging from about 6 to about 15 Angstroms. The zeolite may be a stabilized ultrastable Y-type faujasite, such as the one described in U.S. Pat. No. 3,293,192; U.S. Pat. No. Re. 29,629 (reissue of U.S. Pat. No. 3,402,996); U.S. Pat. Nos. 4,036,739; 3,781,199; 4,036,739.

The zeolites as produced or found in nature normally contain an alkali metal cation, such as sodium and/or potassium and/or an alkaline earth metal cation, such as magnesium and calcium. For use as hydrocarbon cracking catalyst component, it is usually necessary to decrease the alkali metal content of the crystalline zeolite to a content of less than 10 wt. %, preferably less than 6 wt. %, more preferably less than 1 wt. %. The alkali metal content reduction, as is known in the art, may be conducted by exchange with one or more cation selected from the Groups II through VIII of the Periodic Table of Elements (the Periodic Table of Elements referred to herein is given in Handbook of Chemistry and Physics, published by the Chemical Rubber Publishing Company, Cleveland, Ohio, 45th Edition, 1964), as well as with hydrogen cation or hydrogen precursor, e.g., $NH_4+$, capable of conversion to a hydrogen cation. Preferred cations include rare earth metals, calcium, magnesium, hydrogen and mixtures thereof. Ion exchange methods are well known in the art and are described, for example, in U.S. Pat. Nos. 3,140,249; 3,142,251 and 1,423,353, the teachings of which are hereby incorporated by reference. The concentration of the hydrogen cation in the finished zeolite will be that concentration equivalent to the difference between the theoretical cation concentration of the particular zeolite and the amount of cation present in the form of exchanged metal cation and residual alkali metal cation.

The particle size of the zeolite component may range from about 0.1 to 10 microns, preferably from about 0.5 to 3 microns. Suitable amounts of zeolite component in the total catalyst will generally range from about 1 to about 60, preferably from about 1 to about 40, more preferably from about 5 to about 40 wt. % based on the total catalyst.

The inorganic oxide matrices suitable as component of the cracking catalyst of the present invention are non-zeolitic inorganic oxides, such as silica, alumina, silica-alumina, magnesia, boria, titania, zirconia, and mixtures thereof. The matrices may include one or more of various known clays such as montmorillonite, kaolin, halloysite, bentonite, attapulgite and the like. Preferably, the inorganic oxide is a silica-containing material comprising a major amount of silica and a minor amount of an oxide of at least one metal of Groups IIA, IIIA, IVB of the Periodic Table of Elements. Most preferably, the inorganic oxide will be a non-zeolitic silica-alumina. Suitable matrices include the type of matrices prepared from sol, such as described in U.S. Pat. Nos. 3,867,308; 3,957,689; 4,580,023. Discrete particles of porous material, such as alumina, may also be present in the catalyst. It is also within the scope of the present invention to use catalysts comprising carbon monoxide oxidation promoters, and other known cracking catalyst components. Generally the particle size of the total catalyst when used in fluidized catalytic cracking operation will range from about 10 to about 300 microns in diameter, with an average particle diameter of about 60 microns.

Suitable catalytic cracking conditions include a temperature ranging from about 750° to 1300° F., a pressure ranging from about 0 to about 150 psig, typically from about 0 to about 45 psig. The catalyst to oil weight ratio in the cracking zone is lower than the catalyst to oil weight ratio in the catalyst precoking zone. Suitable catalyst to oil weight ratio in the cracking zone used to convert the feed to lower boiling products is not more than about 20:1, and may range from about 20:1 to 2:1, preferably from 4:1 to 9:1. The catalytic cracking process may be carried out as a fixed bed, moving bed, ebullated bed, -slurry, transferline (dispersed phase) or fluidized bed operation. Suitable regeneration temperatures include a temperature ranging from about 1100° to about 1500° F., and a pressure ranging from about 0 to about 150 psig. The oxidizing agent used to contact the partially deactivated (i.e., coked) catalyst will generally be an oxygen-containing gas such as air, oxygen and mixtures thereof. The partially deactivated (coked) catalyst is contacted with the oxidizing agent for a time sufficient to remove, by combustion, at least a portion of the carbonaceous deposit and thereby regenerate the catalyst in a conventional manner known in the art.

DESCRIPTION OF THE PREFERRED EMBODIMENT

Referring to FIG. 1, a suitable hydrocarbon feed is injected via line 10 into transferline riser 12 which contains hot regenerated catalyst. Suitable hydrocarbonaceous feeds for the catalytic cracking process of the present invention include naphtha, hydrocarbonaceous oils boiling in the range of about 430° to about 1050° F., such as gas oil; heavy hydrocarbonaceous oils comprising materials boiling above 1050° F.; heavy and reduced petroleum crude oil; petroleum atmospheric distillation bottoms; Petroleum vacuum distillation bottoms; pitch, asphalt, bitumen, other heavy hydrocarbon residues; tar sand oils; shale oil; liquid products derived from coal liquefaction processes, and mixtures thereof. Upon injection, the—hydrocarbon feed is vaporized by contact with the hot catalyst. The resulting suspension of vaporized hydrocarbons and catalysts flow upwardly through the straight vertically disposed transferline riser where at least a portion of the hydrocarbon feed is cracked to lower boiling products. The density of the catalyst in the suspension may range generally from about 0.7 to about 10 pounds per cubic foot, preferably from about 1 to about 4 pounds per cubic foot. The suspension passes through the transferline riser (reactor) at a velocity between about 8 to about 60 feet per second, preferably from about 15 to about 35 feet per second. The pressure in the transferline riser may be between 10 and 40 psig, for example, about 35 psig.

The cracking temperature in the transferline riser may be between 825° F. and 1200° F., with the temperature at the inlet being higher than that at the outlet of the transferline riser. Suitable space velocity in the transferline riser may range from about 40 to about 200 weights of hydrocarbon feed per hour per weight part of catalyst, and the catalyst to oil weight ratio may be between 3 and 10. The length to diameter (L/D) of the transferline riser may be between 30 and 6. Desirably, the length to diameter ratio of the transferline riser is such as to provide 3 seconds of gas resistance when the gasiform suspension of catalyst flows through the transferline at an average velocity of about 30 feet per second. The contact time can be reduced to about 1 to 2 seconds when easily crackable feed, such as residuum, is processed. The transferline riser projects upwardly into the lower portion of a gas-solids separation vessel 14 and terminates beneath distributing grid 16. Vessel 14 is positioned at a spaced distance and adjacent to regeneration vessel 30. Desirably, at least a portion of it is also positioned at a higher level than the top of vessel 30. The riser enters into the bottom cone of vessel 14 directly under grid 16 which is welded to the vessel shell.

The suspension passes into a dense bed of fluidized catalyst having a level indicated at 18 where further hydrocarbon conversion occurs. The cracked hydrocarbon vapors pass through the upper level of dense fluidized bed into superimposed dilute phase and cyclone separators (not shown) disposed in the upper portion of vessel 14 to separate product vapors from entrained catalyst particles. The catalyst particles are returned to the dense bed via cyclone dipleg and the product vapors are removed via product outlet line 20. Desirably, the cyclone separator may be a two-stage cyclone system. When increased gasoline boiling range product is desired, the dense fluidized bed may be omitted in vessel 14 and a transferline may be extended into the vessel, such that the main conversion of hydrocarbon may occur in the transferline. The transferline may terminate directly in one or more cyclones located near the top of the vessel. Additional cyclones may be used to separate a catalyst substantially completely. The lower portion of vessel 14 comprises a stripping zone 22 in which hydrocarbons which adhere to spent catalysts are removed by stripping with a stripping gas such as steam introduced via line 24. Desirably, grid 16 is sloped to facilitate the flow of spent catalyst into stripping zone 22. The stripping zone is offset 1800 from the transferline entrance into vessel 14. The pressure balance of the unit will allow the catalyst level in the stripping zone to be held either somewhat above grid 16 to provide a higher hold-up operation or it can be held very low in the stripping zone so as to provide dilute phase stripping and no dense bed cracking. Spent stripped catalyst flows from the stripper via control valve 26 into conduct 28 and terminates in the lower portion of regenerator vessel 30. The spent catalyst has a carbonaceous deposit (i.e., coked catalyst) ranging from about 0.5 to about 3.0 wt. % based on the catalyst. The spent catalyst forms a fludized bed having a level indicated at 32 above supporting grid 33 in the regeneration vessel. An oxygen-containing gas (air) is introduced via line 34 into the regeneration vessel to fluidize the catalyst and to react with the carbonaceous deposit thereof. The resulting regenerated catalyst has a decreased amount of carbonaceous deposit. The residual carbon content of the regenerated catalyst may range from 0 to less than the carbon content of the spent catalyst, preferably from 0 to less than 0.1 wt. %. Flue gas formed by combustion of the carbonaceous deposit and entrained solids pass through a cyclone separator system (not shown) disposed in the regeneration vessel. Solids are returned via cyclone dipleg to the fluidized bed while flue gases are removed overhead via line 36. Suitable operating conditions for the regeneration vessels are a temperature in the range of about 750° to about 1500° F., a pressure in the range of about 10 to about 45 psig, a superficial velocity of the gas passing upwardly through the regeneration vessel selected to maintain catalyst particle as a dense turbulent fluidized bed having a density between about 9 and 30 pounds per cubic foot.

The top of the regenerator vessel may be an enlarged section so as to provide sufficient space for adequately housing two or more stages of high efficiency cyclones. An auxiliary burner 38 is attached to the bottom of the regeneration vessel for heating the unit on start-up of the process. The catalyst vessel within the regeneration vessel is held constant by an overflow well 40 located on the center line of the regeneration vessel. The well is an open upper end of downflow withdrawal standpipe 42 which extends into the regeneration vessel.

Standpipe 42 is connected at its lower end by means of angle bend 43 with a vertically inclined conduit 44 which in turn connects with vertical transferline riser 12 which has a section projecting upwardly into vessel 14, as previously described. A hydrocarbon material, for example, a residuum, is introduced by line 50 into line 42 in an amount sufficient to provide a catalyst to hydrocarbon weight ratio of about 200:1. The hydrocarbon material cracks and produces a carbonaceous deposit on the regenerated catalyst, for example, a deposit of about 0.1 wt. %, based on the total weight of the regenerated catalyst. Alternatively, a slip stream of regenerated catalyst may be passed to a separate zone in which the hydrocarbon material contacts the regenerated catalyst at conditions to deposit the desired amount of carbon on the regenerated catalyst and the resulting precoked catalyst portion is thereafter returned to the catalyst line that is being returned to the cracking zone to contact the feed. If desired, the precoked catalyst may simultaneously or subsequently be contacted with $H_2O$ to produce a precoked and hydrated regenerated catalyst. Aeration taps 46, in which a fluidized gas, such as steam, may be injected, are provided along the vertically inclined conduit 44. When it is desired to hydrate the precoked catalyst in the circulating catalyst stream, the hydration may be performed in conduit 44 by introducing a sufficient amount of steam into taps 46 to hydrate the precoked regenerated catalyst. Desirably, the vertically inclined conduit 44 is sloped at an angle of about 45°. The vertically inclined conduit is made long enough so that is will clear the vertical projection of the enlarged section of the regeneration vessel and permit transferline riser 12 to be vertical. If desired, a shutoff valve 48 may be provided at the entrance of the vertically inclined conduit into riser 12 or, alternatively, it may be installed at the bottom of standpipe 42 for use in startup of the unit or in emergency. The shutoff valve will always be either be wide open or closed tight since it is not required for actual regulation of catalyst circulation when the unit is in operation. The shutoff valve may be located essentially anywhere along the length of riser 12 or anywhere along the length of standpipe 42. Instead of a shutoff valve, a ceramic line restriction orifice may be used.

Catalyst flows down into standpipe 42 and assumes a density equal to approximately the minimum fluidization density of the catalyst or to somewhat less than 80% of this density as controlled by aeration gas to the standpipe. Pressure is built up as the catalyst flows down the standpipe. The maximum pressure exists at the angle bend entrance to the vertically inclined conduit. If the regeneration vessel pressure is 40 psig, the pressure at this point is about 46 psig. At this point, the catalyst stream, at approximately the same density, makes the bend and, by hydrostatic force, flows upward to the lower pressure vessel 14. The pressure in vessel 14 may be about 33 psig so that there is a large pressure driving force in the circuit. Catalyst flows upwardly into the vertically inclined conduit at essentially the same density. Aeration is added at aeration taps 46 to compensate the loss of aeration gas which is migrating directly vertically in the inclined conduit. This gas will preserve the fluidity of the catalyst in the bottom portion of the line, since the catalyst would deaerate and slump in the line if aeration were not provided. The aeration gas will flow in the direction of lower pressure in the unit which will be concurrent with the catalyst flow to vessel 14. Alternatively, a quantity of gas greater than required just for aeration or fluidity control can be added to lower the density in the vertical inclined part of conduit 44. This will lower the catalyst density and increase catalyst flow.

The feed is introduced at the top of angle bend at location 10. The pressure at this point will be about 40 psig for a unit with the 40 psig regeneration vessel. Since there is a 46 psig pressure at the bottom of the standpipe for this illustrative embodiment, there is a 6 psig static pressure differential keeping feed from flowing in reverse to the regeneration vessel. This differential is provided by the vertical height of vertically inclined conduit 44.

The following examples are presented to illustrate the invention:

Experiments were performed utilizing the catalysts described in Table I and the feedstock described in Table II.

TABLE I

| Properties of Cracking Catalysts | | |
|---|---|---|
| Catalyst | B | A |
| Surf. Area, m$^2$/gm | 99 | 92 |
| Pore Vol., ml/gm | 0.31 | 0.19 |
| Unit Cell Size, Å | 24.35 | 24.35 |
| SiO$_2$, Wt. % | 57.8 | 60.5 |
| Al$_2$O$_3$, Wt. % | 32 | 31.6 |
| Re$_2$O$_3$, Wt. % | — | 3.40 |
| Na$_2$O$_3$, Wt. % | 0.94 | 0.84 |
| Metals, ppm Ni | 1127 | 246 |
| Metals, ppm V | 5200 | 301 |

TABLE II

| VGO$^{(1)}$ Feedstock-Properties | |
|---|---|
| Gravity, °API at 60° F. | 22.5 |
| Nitrogen, wppm | |
| Total | 983 |
| Basic | 341 |
| Sulfur, Wt. % | .832 |
| Aniline Point, °F. | 183.1 |
| Refractive Index @ 67C | 1.4920 |
| HIVACC Distillation | |
| LV %/°F. | |
| 5 | 650 |
| 10 | 701 |
| 20 | 754 |
| 30 | 789 |
| 40 | 817 |
| 50 | 845 |
| 60 | 873 |
| 70 | 903 |
| 80 | 940 |
| 90 | 991 |
| 95 | 1026 |
| MABP$^{(2)}$ | 847 |

$^{(1)}$VGO means vacuum gas oil
$^{(2)}$MABP is mean average boiling point

EXAMPLE 1

A regenerated commercial catalyst, herein designated Catalyst A, was used in a transfer line reactor at 546° C. to crack VGO at a catalyst:oil ratio of 180:1. This subsequently resulted in a coke deposit of 0.12 wt. %. This precoked catalyst was collected in a hopper and rerun at more conventional operating conditions of catalyst to oil wt. ratio of 6.5 and a reactor temperature of 524° C.

Compared to the essentially coke-free catalyst (CRC=0.01 wt. %), the precoked catalyst showed better selectivity in that both the net and total yields of carbon were lower as shown in Table III.

TABLE III

| | | |
|---|---|---|
| Initial Coke on Cat., Wt. % | 0.01 | 0.12 |
| Type of Coke | CRC$^{(1)}$ | Precoke |
| x(= Conversion to 430° F.), Wt. % | 68.4 | 65.8 |
| C4-, Wt. % | 15.8 | 15.6 |
| C$_5$ to 430° F., Wt. % | 48.2 | 48.0 |
| 430 to 650° F., Wt. % | 16.7 | 15.7 |
| 650° F.+, Wt. % | 15.0 | 18.5 |
| Carbon, Wt. % Net* | 4.1 | 2.2 |
| Carbon, Wt. % Total | 4.2 | 3.1 |
| Carbon/x/(100 − x), Net | 1.9 | 1.2 |
| Carbon/x/(100 − x), Total | 1.9 | 1.5 |

*Net carbon yield corrected for initial coke on catalyst.
$^{(1)}$CRC means coke on regenerated catalyst

EXAMPLE 2

This example shows the distinction between coke-on-regenerated catalyst (CRC) from precoke deposited at a high catalyst to oil weight ratio. A commercially available catalyst, herein designated Catalyst 0 was used.

Table IV compares the cracking behavior of initially coke free Catalyst 0 (CRC 0.01 wt. %) with three other coked catalysts (C, D, E). One of these was a precoked Catalyst C prepared by reacting Catalyst 0 (CRC 0.01 wt. %) with vacuum gas oil at a catalyst to oil weight ratio of about 200:1 and at 543° C. to deposit 0.12 wt. % carbon on the catalyst. The other catalysts, D and E, contained residual CRC type coke resulting from incomplete regeneration. Catalyst D contained 0.16 wt. % CRC and was derived from a catalyst that was originally precoked to about 0.1 wt. %, run at conventional conditions, than partially regenerated in air. Catalyst E contained 0.43 wt. % CRC after regeneration and was derived from an initially coke-free state.

The CRC catalysts, D and E were either no better or worse than the base case catalyst 0 in terms of carbon yield for a given activity. However, the precoked catalyst 0 which was a catalyst in accordance with the present invention, had both the lowest net carbon and total carbon yield and, on the basis of 650° F. conversion, the best selectivity of all four catalysts.

TABLE IV

| Catalyst | B | C | D | E |
|---|---|---|---|---|
| Initial Coke on Catalyst, Wt. % | 0.01 | 0.12 | 0.16 | 0.43 |
| Type of Coke | CRC | Precoke | CRC | CRC |
| x(= Conversion to 650° F.), Wt. % | 86 | 85 | 82 | 83 |
| Carbon Yield, Wt. % Net | 5.5 | 4.1 | 5.3 | 4.3 |
| Carbon Yield, Wt. % Total | 5.5 | 4.7 | 6.5 | 7.1 |
| Carbon/x/(100 − x), Net | 0.9 | 0.7 | 1.2 | 0.9 |
| Carbon/x/(100 − x), Total | 0.9 | 0.8 | 1.4 | 1.4 |

EXAMPLE 3

This example demonstrates a preferred method of coke mitigation in which precoking is combined with prehydration of the Catalyst B. With this combination of pretreatments, the selectivity can be further improved by first precoking the catalyst, then prehydrating (Catalyst F). Catalyst F was made by precoking with VGO at about 200:1 catalyst to oil ratio at 543° C., then treating it with 0.1 wt. % steam.

TABLE V

| Catalyst | B | F |
|---|---|---|
| Initial Coke on Catalyst, Wt. % | 0.01 | 0.17 |
| H₂O Injected over Catalyst, Wt. % | 0.0 | 0.1 |
| x(= Conversion to 650° F.), Wt. % | 86 | 87 |
| Carbon Yield, Wt. % Net | 5.5 | 2.8 |
| Carbon Yield, Wt. % Total | 5.5 | 3.9 |
| Carbon/x/(100 − x), Net | 0.9 | 0.4 |
| Carbon/x/(100 − x), Total | 0.9 | 0.6 |

The net carbon yield was lowered by 50% when precoking and hydration are combined to produce Catalyst E, which is a catalyst in accordance with the present invention.

In determining selectivity for these experiments using precoked catalysts the overall carbon yield was considered. Thus, the initial precoke deposit plus the coke subsequently deposited in the actual process of the experiment was observed to be less than the coke yield formed in a process in which the catalyst was substantially coke-free (i.e., less than 0.01 wt. % coke on regenerated catalyst).

In the above examples, precoking was performed on the whole catalyst inventory before contacting the main feed stream. In a commercial unit, preferably, precoking and main feed injection would be performed in a sequence of increments of the circulating catalyst.

Thus, precoke would be formed continuously by injecting a hydrocarbon at some point upstream of the feed injection point. This may be done by injecting the precoking hydrocarbon medium directly into the regenerated catalyst standpipe, preferably the precoke medium injection point should be far enough upstream of the main feed injection point to allow a precoke deposit to form before contact with the main feed stream.

When precoke and hydration are used in combination, it is preferred that precoke be generated before the catalyst is prehydrated, although a mixed stream of steam and hydrocarbon used for precoking could be injected simultaneously through the same injection port.

What is claimed is:

1. A catalytic cracking process which comprises contacting, at catalytic cracking conditions, a hydrocarbonaceous feed boiling from about 430° F. to about 1050° F. with a catalyst comprised of a zeolite having the structure of faujasite, said catalyst having been produced by contacting a regenerated catalyst comprised of a zeolite having the structure of faujasite with a hydrocarbon material at a high catalyst to said hydrocarbon weight ratio ranging from about 50:1 to 10,000:1 for a time and at conditions sufficient to deposit from about 0.01 to about 0.5 weight percent carbonaceous material based on the total weight of said regenerated catalyst on said regenerated catalyst prior to contacting said feed at said cracking conditions.

2. The process of claim 1 wherein said hydrocarbon material utilized to contact said regenerated catalyst at said high catalyst to hydrocarbon ratio is selected from the group consisting of a single hydrocarbon and a mixture of light hydrocarbons.

3. The process of claim 1 wherein said hydrocarbon material utilized at said high catalyst to hydrocarbon ratio is a mixture of hydrocarbons having the same boiling point range as said feed.

4. The process of claim 1 wherein said catalyst to hydrocarbon ratio ranges from about 200:1 to 1000:1 and said contact is carried out for a time sufficient to deposit from about 0.05 to about 0.20 wt. % carbonaceous material on said regenerated catalyst.

5. The process of claim 1 wherein said conditions in said high catalyst to hydrocarbon contacting step include a temperature ranging from about 900° to about 1450° F. and a pressure ranging from about 0 to about 150 psig.

6. The process of claim 1 wherein said regenerated catalyst prior to being contacted with said hydrocarbon material comprises from about 0.001 to about 0.50 weight percent carbon based on the total weight of said regenerated catalyst.

7. The process of claim 1 wherein said catalyst is a hydrated catalyst, said hydrated catalyst having been produced by contacting said regenerated catalyst with H₂O during or after said contacting with said hydrocarbon material.

8. In a catalytic cracking process wherein a coked cracking catalyst having the structure of faujasite is passed from a cracking zone to a regeneration zone to remove at least a portion of said coke from said coked catalyst and thereby produce a regenerated catalyst and wherein a stream of regenerated catalyst is circulated to a cracking zone to contact a hydrocarbonaceous feed boiling from about 430° F. to 1050° F. at cracking conditions, the improvement with comprises treating said regenerated catalyst with a hydrocarbon material at a high catalyst to said hydrocarbon weight ratio ranging from about 50:1 to 10,000:1 at conditions to deposit from about 0.01 to 0.5 weight percent carbonaceous material based on the total weight of said regenerated catalyst on said regenerated catalyst and thereby produce a precoked catalyst and subsequently contacting said hydrocarbonaceous feed with the resulting precoked catalyst.

9. The process of claim 8 wherein said regenerated catalyst is treated with said hydrocarbon material at said high catalyst to said hydrocarbon weight ratio during circulation of said regenerated catalyst to said cracking zone.

10. The process of claim 8 wherein at least a portion of said regenerated catalyst is passed to a separate zone wherein said portion is contacted with said hydrocarbon material at said high catalyst to hydrocarbon weight ratio to produce said precoked catalyst and, thereafter, said precoked catalyst is contacted with said hydrocarbon feed in said cracking zone.

11. The process of claim 8 wherein said regenerated catalyst is contacted with $H_2O$ during or after said treatment with said hydrocarbon material to produce a precoked and hydrated catalyst.

12. The catalytic cracking process of claim 8 wherein said cracking conditions include a temperature ranging from about 750° to 1300° F. and wherein said regeneration conditions include a temperature ranging from about 1100° to 1500° F.

13. The catalytic cracking process of claim 8 wherein said hydrocarbonaceous feed is contacted with said precoked catalyst in said cracking zone at a catalyst to feed ratio of not more than about 20:1.

* * * * *